United States Patent
Fuchino

(10) Patent No.: US 8,184,403 B2
(45) Date of Patent: May 22, 2012

(54) DISK DRIVE SUSPENSION

(75) Inventor: Hideki Fuchino, Chigasaki (JP)

(73) Assignee: NKH Spring Co., Ltd., Yokohama-Shi (JP)

( * ) Notice: Subject to any disclaimer, the term of this patent is extended or adjusted under 35 U.S.C. 154(b) by 545 days.

(21) Appl. No.: 12/400,225

(22) Filed: Mar. 9, 2009

(65) Prior Publication Data

US 2009/0225475 A1    Sep. 10, 2009

(30) Foreign Application Priority Data

Mar. 10, 2008 (JP) ................... 2008-060254

(51) Int. Cl.
*G11B 5/48* (2006.01)
(52) U.S. Cl. ................. 360/244.2; G9B/5.147
(58) Field of Classification Search .......... None
See application file for complete search history.

(56) References Cited

U.S. PATENT DOCUMENTS

| 6,067,209 | A | 5/2000 | Aoyagi et al. |
| 6,172,853 | B1 | 1/2001 | Davis et al. |
| 2006/0034017 | A1 * | 2/2006 | Agari et al. ............... 360/245.7 |
| 2006/0092571 | A1 * | 5/2006 | Kang ........................ 360/245.7 |
| 2007/0247760 | A1 * | 10/2007 | Hanya et al. ............... 360/245.5 |

FOREIGN PATENT DOCUMENTS

| JP | 63-130969 U | 8/1988 |
| JP | 7-78436 A | 3/1995 |
| JP | 11-66522 A | 3/1999 |
| JP | 2004-86984 A | 3/2004 |

OTHER PUBLICATIONS

Japanese Office Action dated Jul. 5, 2011 and English translation thereof in counterpart Japanese Application No. 2008-060254.

* cited by examiner

*Primary Examiner* — Hoai V Ho
*Assistant Examiner* — James G Norman
(74) *Attorney, Agent, or Firm* — Holtz, Holtz, Goodman & Chick, PC

(57) ABSTRACT

A suspension is provided with a load beam and a flexure including a tongue on which a slider is mounted. A limiter is formed by cutting and raising a part of the tongue. The limiter includes a bent portion and arm. The tongue has an opening that is left after the limiter is cut and raised. The opening and limiter are formed along a center line of the tongue. A distal end of the dimple is in contact with a back surface of the slider through the opening.

4 Claims, 7 Drawing Sheets

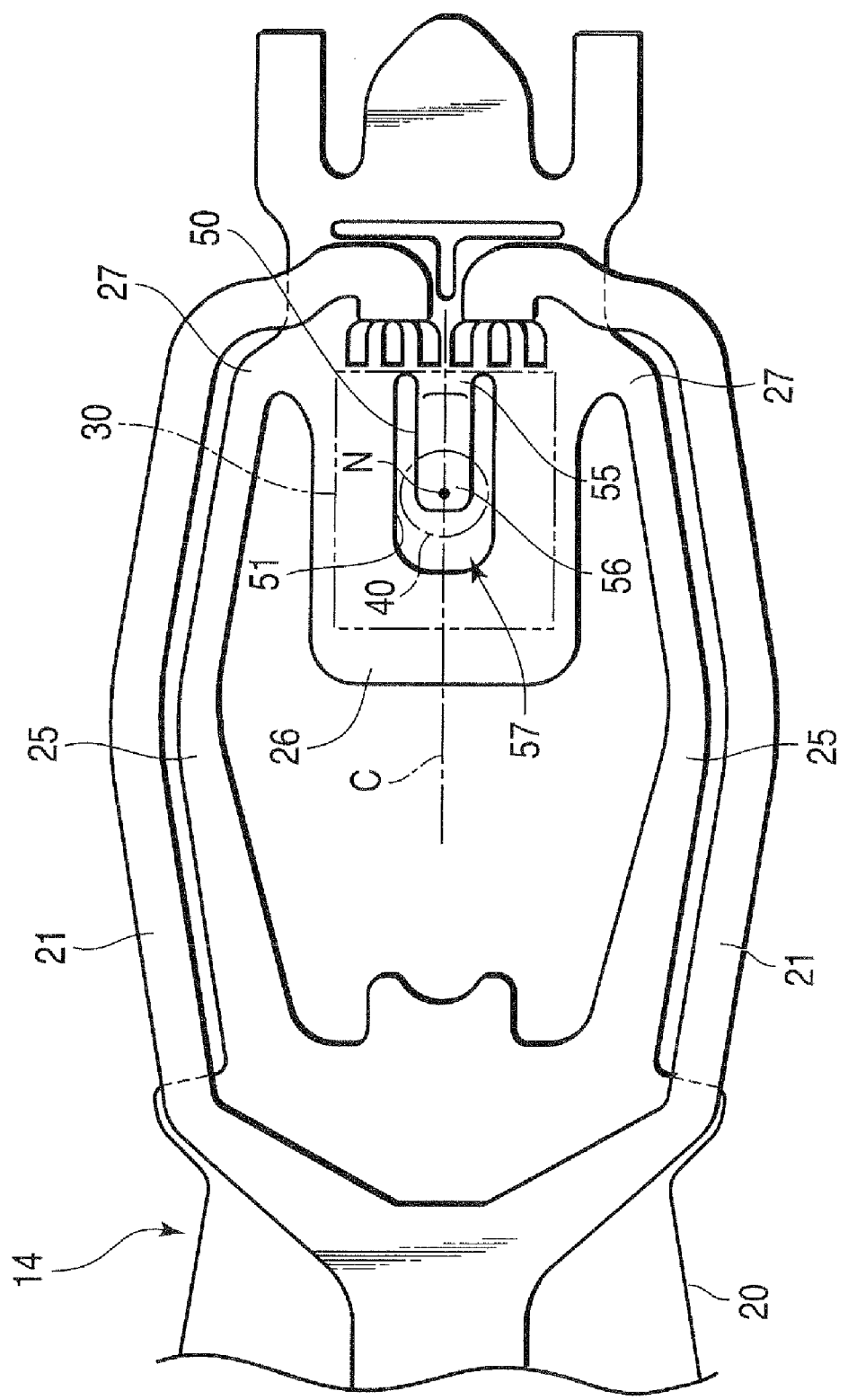
F I G. 5

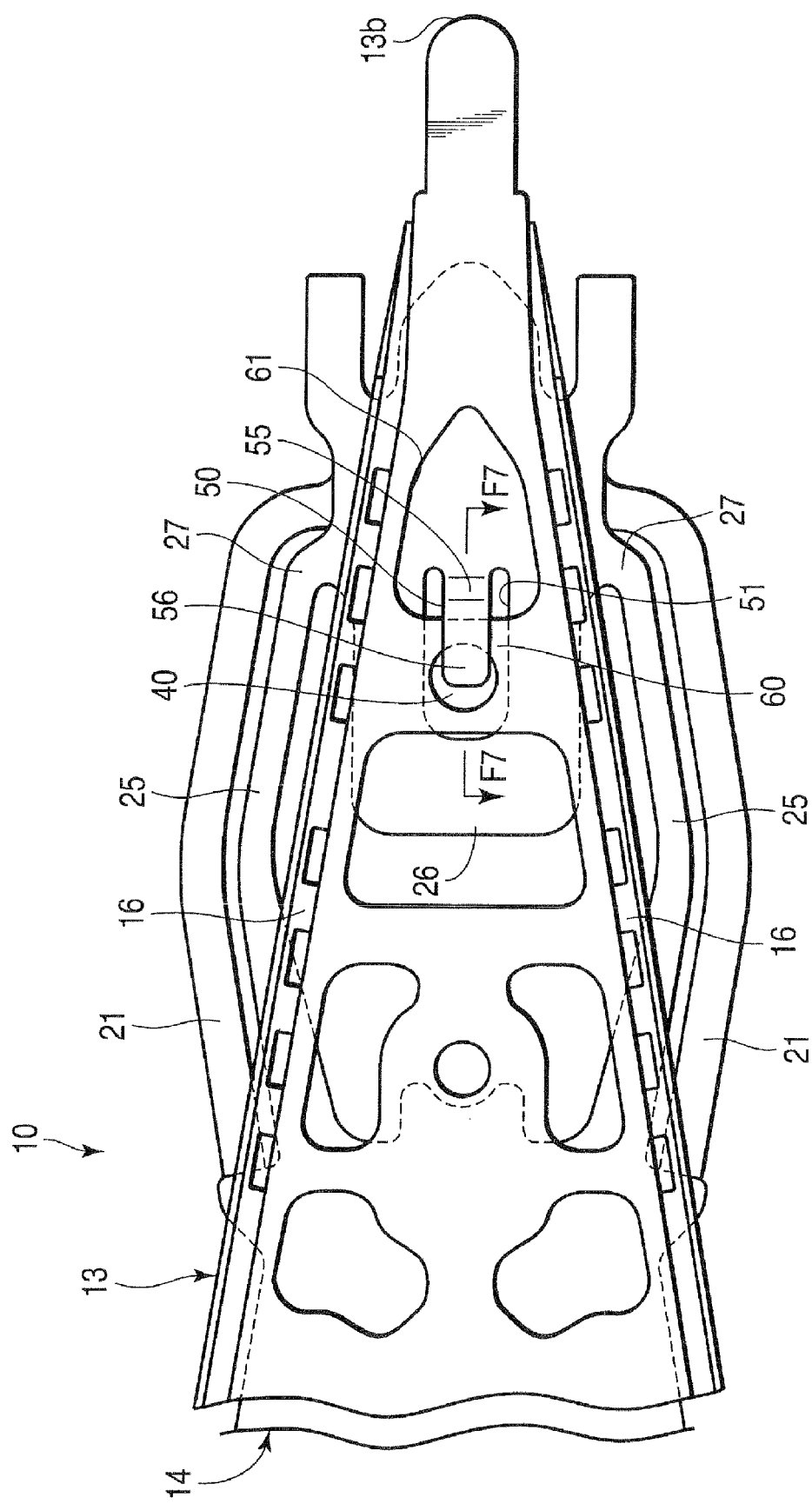
F I G. 6

DISK DRIVE SUSPENSION

CROSS-REFERENCE TO RELATED APPLICATIONS

This application is based upon and claims the benefit of priority from prior Japanese Patent Application No. 2008-060254, filed Mar. 10, 2008, the entire contents of which are incorporated herein by reference.

BACKGROUND OF THE INVENTION

1. Field of the Invention

This invention relates to a disk drive suspension used in an information processing apparatus provided with a disk for use as a recording medium.

2. Description of the Related Art

A hard disk drive (HDD) for recording and reading information on and from a rotating disk includes a carriage that is turnable around a pivot. The carriage is turned around the pivot by a positioning motor. The carriage is provided with an arm (actuator arm), suspension provided on the distal end portion of the arm, and slider mounted on the distal end portion of the suspension.

The suspension is provided with a base portion including a base plate, load beam, flexure superposed on the load beam, etc. The slider is mounted on a tongue that is formed on a part of the flexure. A protuberance that is called dimple is formed at the distal end portion of the load beam. The dimple projects toward the slider so that its distal end abuts the tongue. Thus, the slider is swingably supported by the dimple. When the disk rotates, the slider flies slightly above the surface of the disk, and an air bearing is formed between the disk and slider.

In a disk drive suspension, such as the one disclosed in U.S. Pat. No. 6,172,853 (Patent Document 1), a part of the flexure may be provided with a limiter for suppressing excessive movement of the slider. The limiter of Patent Document 1 is formed by bending a part of the tongue along its width.

The limiter of Patent Document 1 is cut and raised from one side of a center line that passes through the transverse center of the tongue, accordingly a large hole is left in the other side of the center line. Therefore, the distribution of the mass of the tongue is laterally asymmetrical with respect to the center line, so that the mass of the tongue may be unbalanced, and hence, influence the behavior of the slider.

Although the large hole is left in the suspension of Patent Document 1 after the limiter is bent, moreover, the hole is not used for anything. Since this hole is large and has a complicated shape, furthermore, it makes the tongue not only larger but also heavier. There is also a problem that the mass of the limiter becomes greater.

BRIEF SUMMARY OF THE INVENTION

The present invention provides a disk drive suspension, capable of preventing enlargement of a tongue with a limiter, reducing the mass of the limiter, and preventing the mass of the tongue from being unbalanced.

The invention comprises a load beam, a flexure which is superposed on the load beam and includes a tongue on which a slider is mounted, a dimple which is disposed on the load beam and supports the slider for swinging motion, and a limiter which is formed by cut and raised a part of the tongue and which suppresses movement of the slider, the limiter including a bent portion bent along the thickness of the tongue and an arm which extends from the bent portion toward a back surface of the dimple, is inserted into a hole in the load beam, and faces a receiving portion of the load beam, the dimple having a distal end inserted into an opening which is left after the limiter is cut and raised and in contact with a back surface of the slider.

According to this arrangement, the limiter formed on the tongue may be simplified in shape and reduced in size and mass. Since the limiter is formed in the transverse center of the tongue, moreover, the mass of the tongue can be prevented from being deflected to one side of a center line of the tongue. Further, the distal end of the dimple can be brought into contact with the back surface of the slider by using the opening left after the limiter is cut and raised.

In a preferred aspect of the invention, the limiter is formed in the transverse center of the tongue, and the arm extends longitudinally relative to the tongue along a center line thereof. Further, the hole in the load beam is formed in a position closer to the distal end of the load beam than the dimple is, and the arm is inserted into the hole and faces the receiving portion of the load beam. A mark portion such as a notch, which can be used to align the dimple and the limiter, may be provided on the distal end or the like of the arm of the limiter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a partial plan view of a flexure of the suspension shown in FIG. 1;

FIG. 6 is a partial enlarged view of the suspension shown in FIG. 1;

DETAILED DESCRIPTION OF THE INVENTION

One embodiment of the present invention will now be described with reference to FIGS. 1 to 7.

Figure 1:
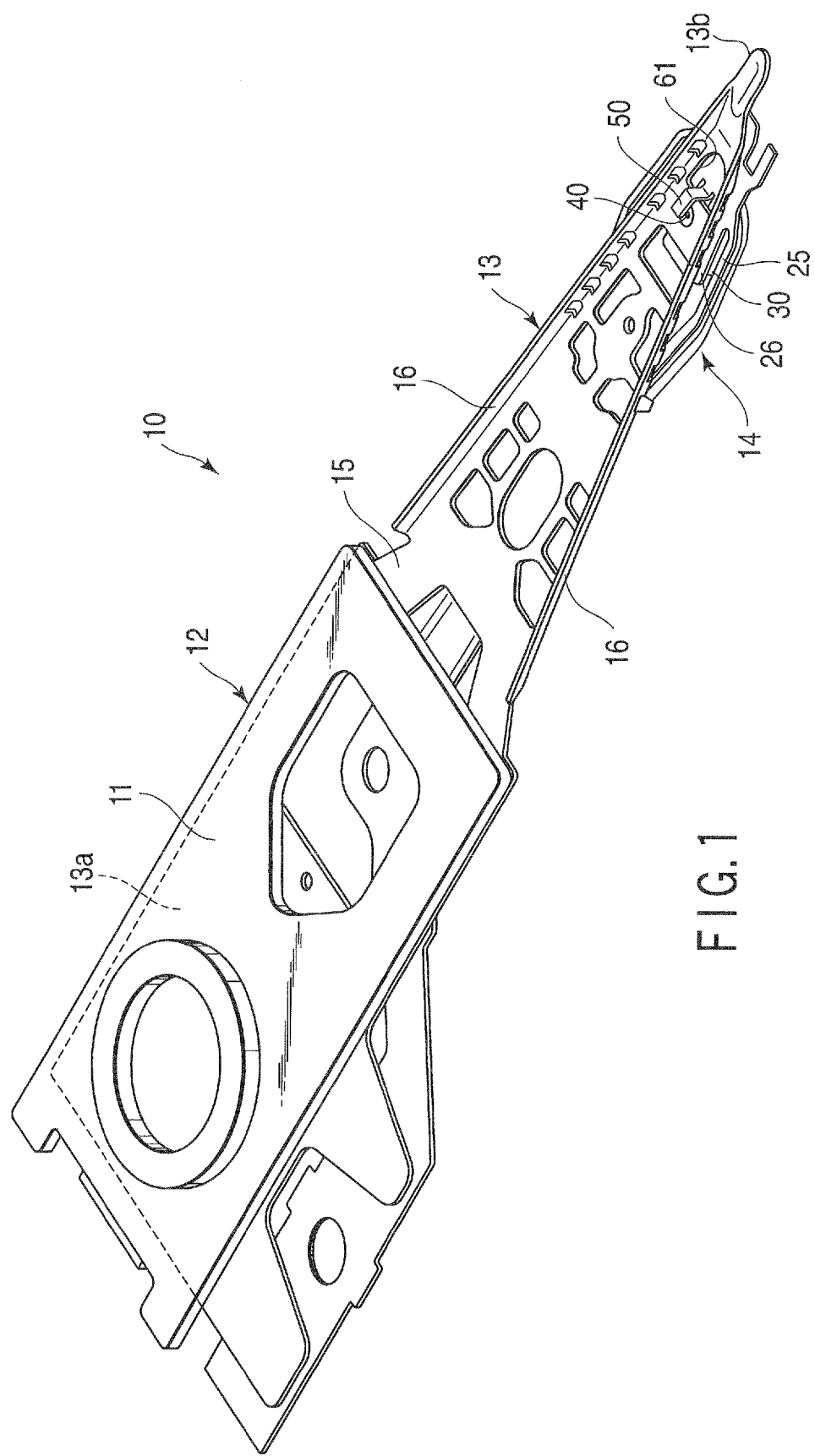
FIG. 1 is a perspective view of a disk drive suspension according to one embodiment of the invention.

FIG. 1 shows a disk drive suspension (hereinafter referred to simply as the suspension) 10. The suspension 10 is provided with a base portion 12 including a base plate 11, load beam 13, flexure 14 with conductor, etc. The base portion 12 is fixed to an actuator arm (not shown) of a carriage. The actuator arm is turned by a positioning motor incorporated in a disk drive. The load beam 13 is fixed to the base portion 12.

The flexure 14 with conductor (hereinafter referred to simply as the flexure 14) is superposed on the load beam 13 along its thickness.

A proximal portion 13a of the load beam 13 is fixed overlapping the base plate 11. The thickness of the load beam 13 ranges, for example, from about 30 to 100 μm. A springy hinge portion 15 is formed on the proximal portion 13a of the load beam 13. The hinge portion 15 is formed near the base portion 12 and can be deformed along its thickness.

A pair of bent edge portions 16 are formed individually on the opposite side portions of the load beam 13 in order to enhance the bending stiffness of the load beam 13. In order to reduce the weight of the load beam 13, a plurality of perforations 17 (shown in FIG. 2) are formed along the bent edge portions 16 in regions including the bent edge portions 16. These perforations 17 are formed by, for example, etching and penetrate the load beam 13 along its thickness.

Figure 2:
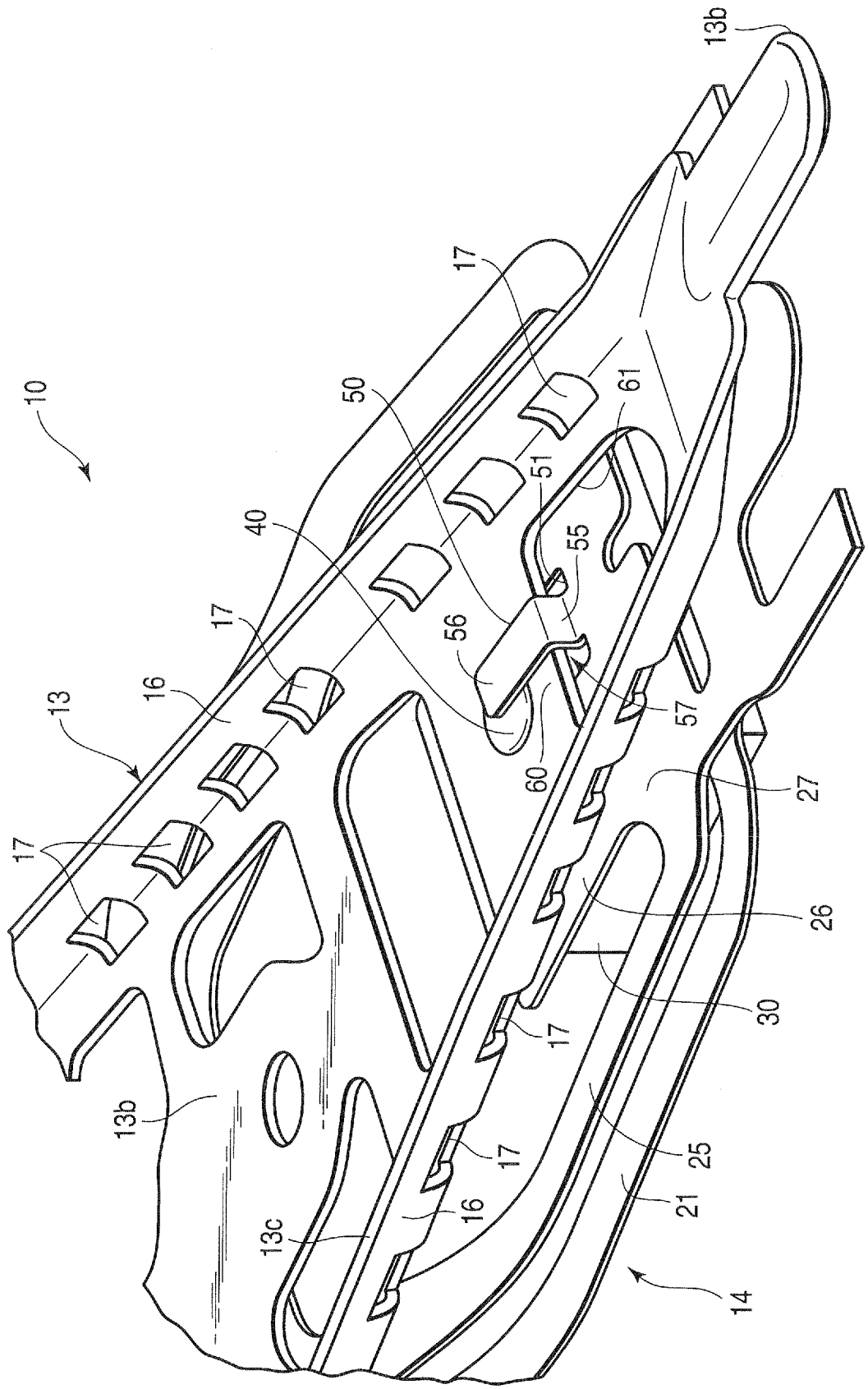
FIG. 2 is an enlarged perspective view of a distal end portion of the suspension shown in FIG. 1.
Figure 3:
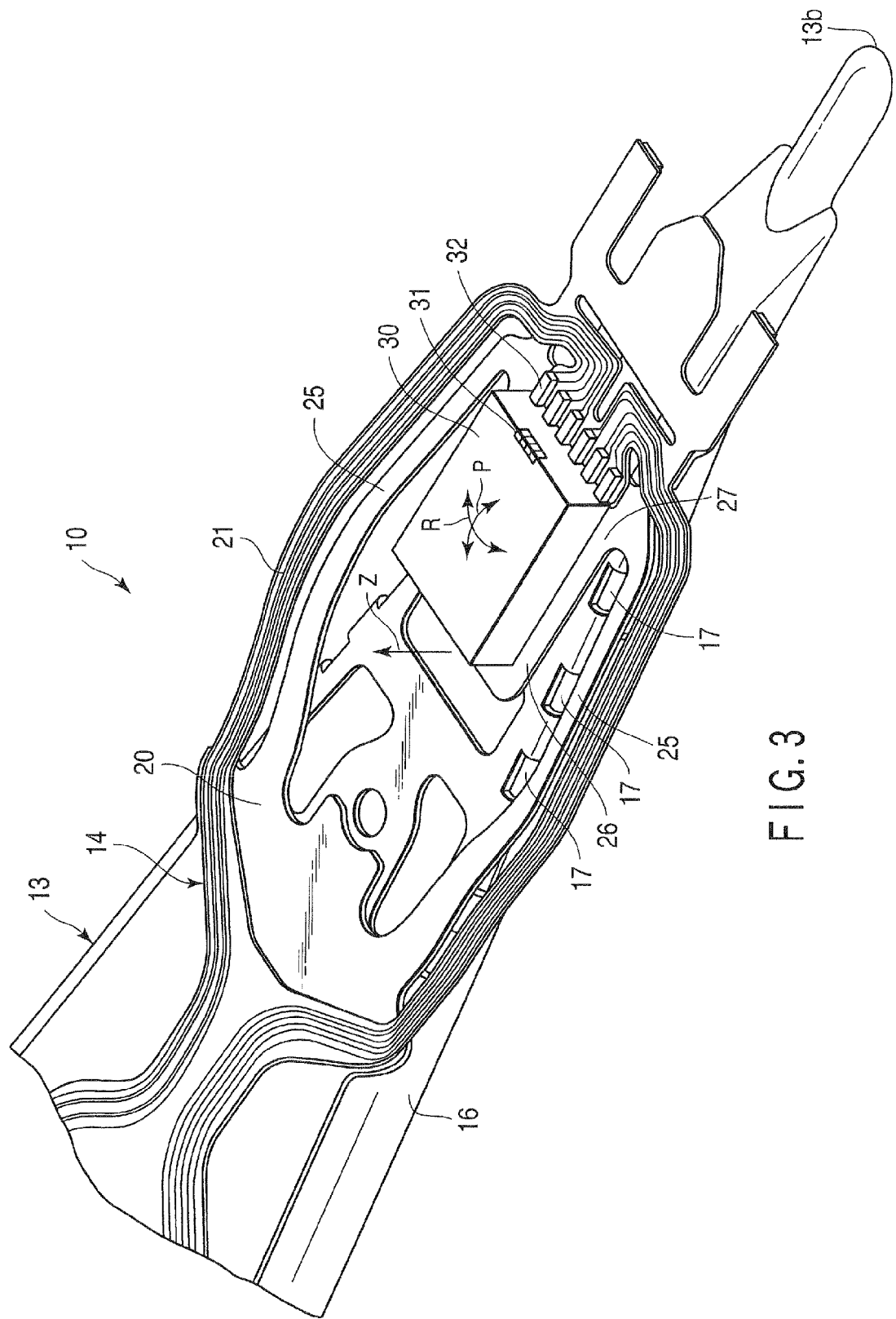
FIG. 3 is a perspective view of the distal end portion of the suspension shown in FIG. 2, taken from a slider.

FIG. 2 shows a distal end portion of the suspension 10. FIG. 3 is a perspective view of the distal end portion of the suspension 10 taken from the opposite side from FIG. 2. The flexure 14 is located extending along the load beam 13. The flexure 14 is provided with a metal base 20 and conductive member 21 with a predetermined pattern. The metal base 20 is formed of a metal plate that is thinner than the load beam 13. The conductive member 21 is formed along the metal base 20 with an electrically insulating material therebetween. The metal base 20 of the flexure 14 is formed of a rolled sheet of stainless steel with a thickness of, for example, about 10 to 25 μm. The metal base 20 is fixed in a predetermined position on the load beam 13 by fixing means, such as laser welding.

The flexure 14 is provided integrally with a pair of outrigger portions 25 (left and right) and tongue 26 as a movable portion. The tongue 26, which is a part of the elastic metal base 20, is deformable along the thickness of the flexure 14. The tongue 26 connects with the outrigger portions 25 through a continuous portion 27 that is formed near the distal end portion of the load beam 13.

A slider 30 (shown in FIG. 3) that forms a magnetic head portion is mounted on the tongue 26. An element 31, such as a magnetoelectric conversion element that functions as a transducer, is disposed on a front end portion of the slider 30. Terminals 32 of the slider 30 are electrically connected to the conductive member 21 of the flexure 14.

Figure 4:
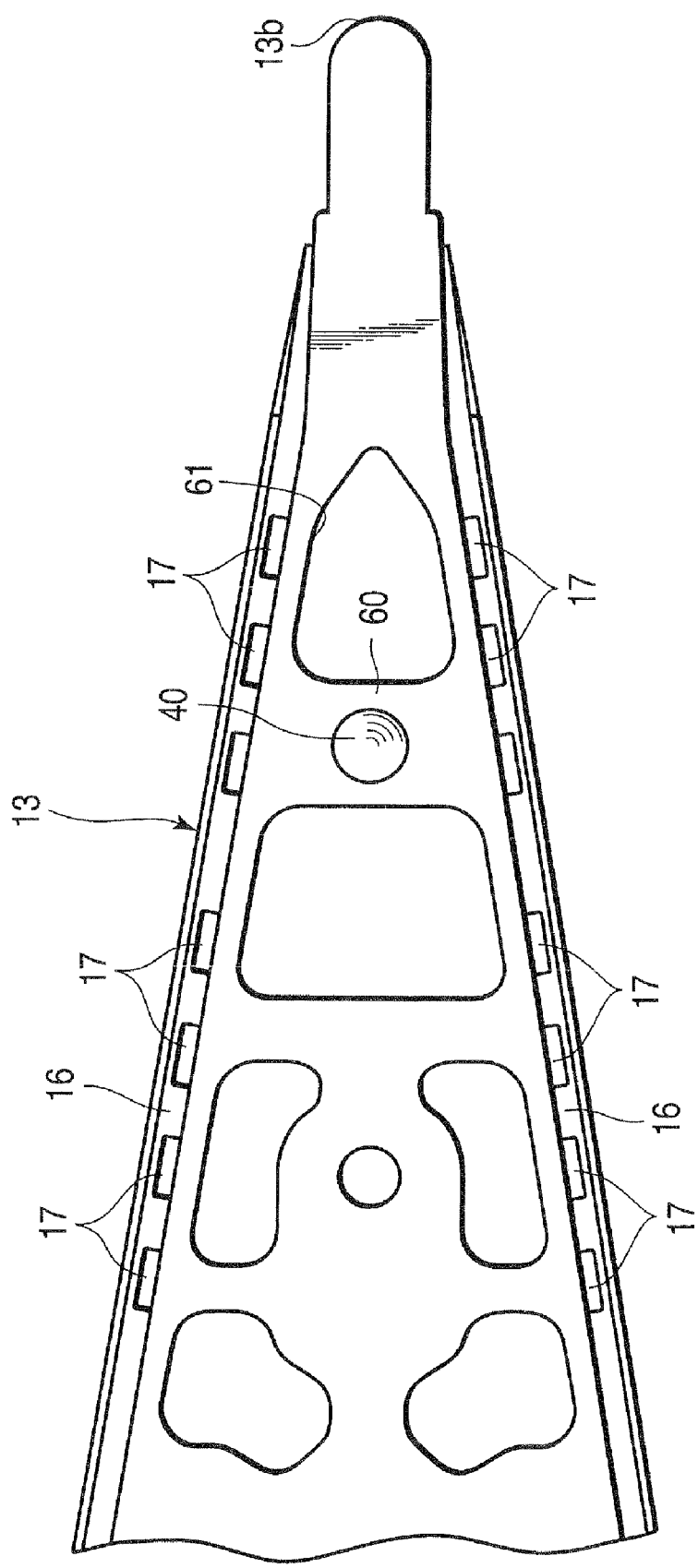
FIG. 4 is a plan view of a load beam of the suspension shown in FIG. 1.
Figure 7:
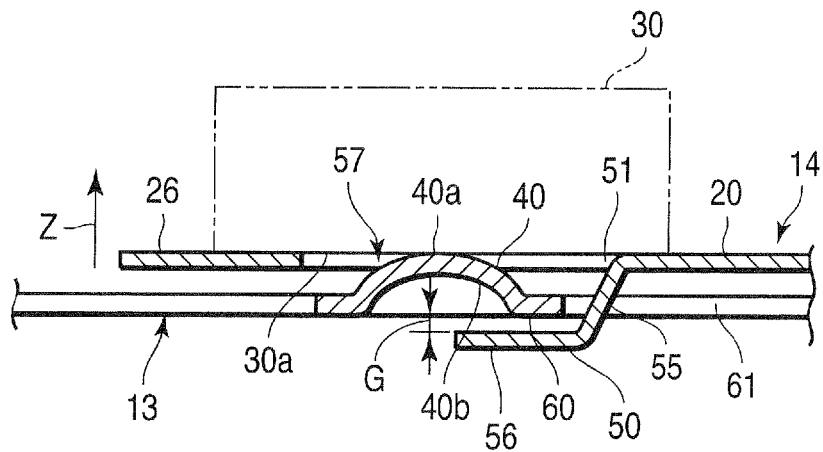
FIG. 7 is a partial sectional view of the suspension taken along line F7-F7 of FIG. 6.

As shown in FIG. 4, a dimple 40 is formed near the distal end portion of the load beam 13. As shown in FIG. 7, the dimple 40 projects toward the slider 30. A distal end 40a of the dimple 40 is in contact with a back surface 30a of the slider 30. Thus, the tongue 26 and slider 30 can swing in a rolling direction R (shown in FIG. 3), pitching direction P, etc., around the dimple 40.

A limiter 50 is formed on the tongue 26. The limiter 50 is formed by cutting and raising a transverse central part of the tongue 26. As shown in FIG. 5, a U-shaped hole 51 for defining the contour of the limiter 50 is formed in the central portion of the tongue 26. The hole 51 is formed by etching so as to be symmetrical with respect to a center line C (shown in FIG. 5) that passes through the transverse center of the tongue 26.

The limiter 50 includes a bent portion 55 and arm 56. The bent portion 55 is formed by bending an inside part that is defined by the U-shaped hole 51 along the thickness by means of a precision press. As shown in FIG. 7, the arm 56 extends from the bent portion 55 toward a back surface 40b of the dimple 40. An opening 57 that is larger than the U-shaped hole 51 is formed as a trace of the cut-and-raised limiter 50 in the tongue 26. The opening 57 has a sufficiently large area for the passage of the dimple 40. Since the opening 57 is as large as the limiter 50, the mass of the tongue 26 is not increased despite the presence of the limiter 50.

The bent portion 55 and arm 56 are individually formed along the center line C of the tongue 26. The arm 56 extends longitudinally relative to the flexure 14 along the center line C of the tongue 26. Thus, the tongue 26 with the limiter 50 is bisymmetrical with respect to the center line C.

As shown in FIG. 4, etc., the load beam 13 includes a receiving portion 60 and hole 61. The receiving portion 60 is situated near the dimple 40. The hole 61 is formed in a position closer to a distal end 13b of the load beam 13 than the dimple 40 is. The hole 61 penetrates the load beam 13 along its thickness.

As shown in FIG. 6, the limiter 50 is inserted into the hole 61 of the load beam 13. More specifically, the limiter 50 is inserted into the hole 61 from the side of the distal end 13b of the load beam 13. The limiter 50 extends along the center line C toward the back surface 40b of the dimple 40 and the receiving portion 60. The arm 56 of the limiter 50 faces the back surface 40b of the dimple 40 and the receiving portion 60. As shown in FIG. 7, a gap G is defined between the arm 56 and receiving portion 60.

The distal end 40a of the dimple 40 is inserted into the opening 57 of the tongue 26 that is left after the limiter 50 is cut and raised. The distal end 40a of the dimple 40 is in contact with the back surface 30a of the slider 30. Accordingly, the back surface 30a of the slider 30 is supported directly by the distal end 40a of the dimple 40. Thus, the opening 57, that is, the trace of the cut-and-raised limiter 50, can be used effectively.

The limiter 50 has a function to keep the slider 30 from retreating from the dimple 40 (or from so-called dimple separation). Thus, the limiter 50 suppresses movement of the slider 30 relative to the dimple 40. Let us suppose a case, for example, where the back surface 30a of the slider 30 is just separating from the distal end 40a of the dimple 40 as the slider 30 moves in the direction indicated by arrow Z in FIG. 7. In this case, the arm 56 of the limiter 50 engages with the receiving portion 60 of the load beam 13. Thus, the slider 30 is kept from retreating from the dimple 40.

The limiter 50 of the present embodiment is formed by cutting and raising a part of the tongue 26. Despite the presence of the limiter 50, therefore, the mass of the tongue 26 is not increased. Further, the limiter 50 can be provided without enlarging the tongue 26. In the tongue 26 provided with this limiter 50, the limiter 50 and opening 57 are individually bisymmetrical with respect to the center line C. Therefore, the mass of the tongue 26 is balanced from side to side. Thus, the tongue 26 with the limiter 50 can swing around the dimple 40 without any influence on its behavior.

In the present embodiment, the hole 61 of the load beam 13 into which the limiter 50 is inserted is formed in front of (or closer to the distal end 13b of the load beam 13 than) the dimple 40. The arm 56 of the limiter 50 is inserted into the hole 61 from the front (on the side of the distal end 13b) of the load beam 13. The arm 56 faces the receiving portion 60 of the load beam 13. The limiter 50 is situated near the front end portion of the slider 30.

As the tongue 26 of the flexure 14 and its surrounding region swing, therefore, the front end portion of the slider 30 on which the element 31 is disposed can be more effectively kept from moving. Further, the limiter 50 is composed of the bent portion 55 that rises along the thickness of the tongue 26 and the arm 56 that extends from the bent portion 55 toward the receiving portion 60. Thus, the limiter 50 is advantageous in having a simple shape and small size.

FIG. 5 is a plan view of the flexure 14 taken along its thickness. In general, the center of the dimple 40 is situated near a center of gravity N of the slider 30. In the suspension 10 of the present embodiment, the arm 56 of the limiter 50 is located near the dimple 40. When compared with the conventional case (where the limiter is situated apart from the dimple), therefore, "fluttering" of the slider 30 can be more effectively suppressed when the suspension 10 is shocked.

FIG. 6 is a plan view of the limiter 50 taken along the thickness of the load beam 13. The suspension 10 of the present embodiment is configured so that the dimple 40 and limiter 50 can be simultaneously observed when the limiter 50 is viewed alone the thickness of the load beam 13. For example, the center position of the dimple 40 can be viewed from the limiter 50 of the flexure 14. Therefore, the relative positions of the dimple 40 and limiter 50 can be grasped with ease, so that the load beam 13 and flexure 14 can be aligned accurately. Thus, the mechanical properties of the suspension 10 can be prevented from being degraded by relative dislocation of the load beam 13 and flexure 14.

Figure 8:
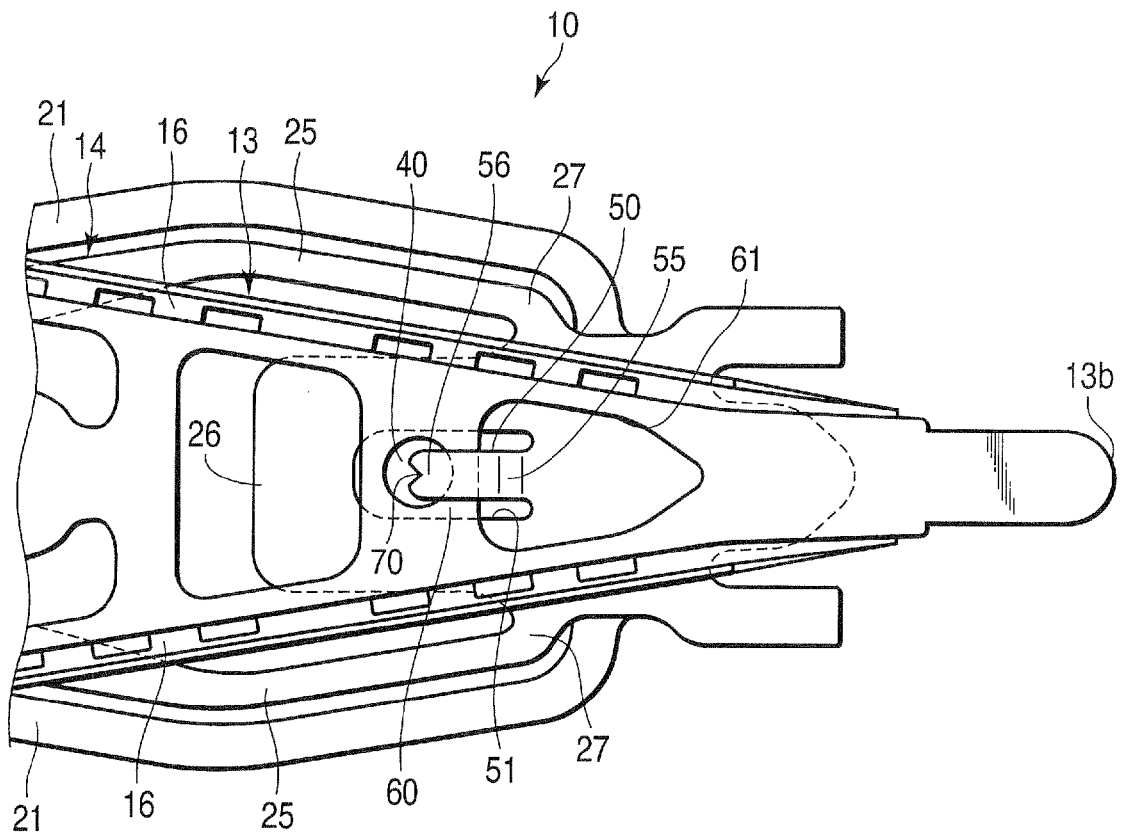
FIG. 8 is a partial plan view of a suspension according to another embodiment of the invention.

FIG. 8 shows a part of a suspension 10 according to another embodiment of the invention. This suspension 10 includes a mark portion 70. The mark portion 70 is used in aligning the limiter 50 and dimple 40. An example of the mark portion 70 is a V-notch in the distal end of the arm 56 of the limiter 50. The mark portion 70 is observed along the thickness of the limiter 50 as it is aligned with the center of the dimple 40. By doing this, the load beam 13 and flexure 14 can be more accurately aligned with each other. The mark portion may be of another shape.

It is to be understood, in carrying out the invention, that the specific configurations, shapes, and arrangements of the load beam, flexure, limiter, etc., may be embodied in variously modified forms without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension, comprising:
   a load beam;
   a flexure which is superposed on the load beam and includes a tongue on which a slider is mounted;
   a dimple which is disposed on the load beam and supports the slider for swinging motion; and
   a limiter which comprises a part of the tongue that is partially separated from a main portion of the tongue, and which suppresses movement of the slider;
   wherein the limiter includes a bent portion which is bent along a thickness of the tongue and an arm which extends from the bent portion toward a back surface of the dimple, and wherein the limiter is inserted into a hole in the load beam, and faces a receiving portion of the load beam,
   wherein the dimple having has a distal end which is inserted into an opening corresponding to the partial separation of the limiter, and which is in contact with a back surface of the slider;
   wherein a distal end of the arm of the limiter overlaps with the back surface of the dimple when viewed in a plan view of the load beam.

2. A disk drive suspension according to claim 1, wherein the limiter is formed in the transverse center of the tongue, and the arm extends longitudinally relative to the tongue along a center line thereof.

3. A disk drive suspension according to claim 2, wherein the hole in the load beam is formed in a position closer to the distal end of the load beam than the dimple is, and the arm is inserted into the hole and faces the receiving portion of the load beam.

4. A disk drive suspension according to claim 1, wherein the arm of the limiter is provided with a mark portion for alignment with the dimple.

* * * * *

UNITED STATES PATENT AND TRADEMARK OFFICE
CERTIFICATE OF CORRECTION

PATENT NO.       : 8,184,403 B2
APPLICATION NO.  : 12/400225
DATED            : May 22, 2012
INVENTOR(S)      : Hideki Fuchino It is certified that error appears in the above-identified patent and that said Letters Patent is hereby corrected as shown below:

On the title page:

Item (73) Assignee;

change "NKH Spring Co., Ltd.," to --NHK Spring Co., Ltd.,--.

Signed and Sealed this
Twenty-eighth Day of August, 2012

David J. Kappos
*Director of the United States Patent and Trademark Office*